(12) United States Patent
Katano

(10) Patent No.: US 7,910,257 B2
(45) Date of Patent: Mar. 22, 2011

(54) FUEL CELL SYSTEM AND FUEL CELL VEHICLE

(75) Inventor: Koji Katano, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 321 days.

(21) Appl. No.: 12/294,838

(22) PCT Filed: Dec. 5, 2007

(86) PCT No.: PCT/JP2007/073892
§ 371 (c)(1),
(2), (4) Date: Sep. 26, 2008

(87) PCT Pub. No.: WO2008/072643
PCT Pub. Date: Jun. 19, 2008

(65) Prior Publication Data
US 2010/0239935 A1 Sep. 23, 2010

(30) Foreign Application Priority Data
Dec. 7, 2006 (JP) .................................. 2006-330723

(51) Int. Cl.
*H01M 8/04* (2006.01)
*B60K 6/20* (2007.10)
(52) U.S. Cl. .................................... 429/444; 180/65.21
(58) Field of Classification Search .................. 429/443, 429/416, 19, 444, 433, 502; 180/65.21
See application file for complete search history.

(56) References Cited

U.S. PATENT DOCUMENTS
3,915,747 A * 10/1975 Summers et al. ............. 429/416
2002/0048698 A1* 4/2002 Fronk ............................. 429/19

FOREIGN PATENT DOCUMENTS
JP 2004-178847 A * 6/2004
(Continued)

OTHER PUBLICATIONS
Abstract of JP 2004-178847 A, Kanazawa et al., Jun. 2004.*
(Continued)

*Primary Examiner* — Jonathan Crepeau
*Assistant Examiner* — Kenneth Douyette
(74) *Attorney, Agent, or Firm* — Kenyon & Kenyon LLP

(57) ABSTRACT

A fuel cell system according to the present invention includes a fuel cell; a fuel supply system for supplying a fuel gas to the fuel cell; an injector which drives a valve body with an electromagnetic driving force in a predetermined driving period to detach the valve body from a valve seat, whereby a gas state on the upstream side of the fuel supply system is adjusted to jet the gas to a downstream side; and a control device which controls the operation of the injector. The control device allows the injector to jet the gas with a jet flow rate of a predetermined jet flow rate or less in a case where the demanded amount of a power to be generated with respect to the fuel cell is the predetermined amount of the power to be generated or less, and the control device sets the driving frequency of the injector in accordance with the jet flow rate and the demanded amount of the power to be generated.

10 Claims, 3 Drawing Sheets

FOREIGN PATENT DOCUMENTS

| | | | |
|---|---|---|---|
| JP | 2005-226715 A | * | 8/2005 |
| JP | 2005-302563 A | | 10/2005 |
| JP | 2005-302571 A | | 10/2005 |
| JP | 2005-327596 A | | 11/2005 |
| JP | 2007-165186 A | | 6/2007 |
| JP | 2007-305348 A | | 11/2007 |
| JP | 2008-41329 A | | 2/2008 |

OTHER PUBLICATIONS

Abstract of JP 2005-226715 A, Bono et al., Aug. 2005.*
Machine translation of JP 2004-178847 A, Kanazawa et al., Jun. 2004.*
Machine translation of 2005-226715 A, Bono et al., Aug. 2005.*
Machine translation of JP 2005-327596 A, Katano et al., Nov. 2005.*

* cited by examiner

FUEL CELL SYSTEM AND FUEL CELL VEHICLE

This is a 371 national phase application of PCT/JP2007/073892 filed 05 Dec. 2007, which claims priority to Japanese Patent Application No. 2006-330723 filed 07 Dec. 2006, the contents of which are incorporated herein by reference.

TECHNICAL FIELD

The present invention relates to a fuel cell system including an injector in a fuel supply system for supplying a fuel gas to a fuel cell, and a fuel cell vehicle.

BACKGROUND ART

In recent years, a technology has been suggested in which an injector is arranged in a fuel supply channel of a fuel cell system, and the operation state of this injector is controlled to adjust the supply pressure of a fuel gas in the fuel supply channel (e.g., see Japanese Patent Application Laid-Open No. 2005-302563). In the injector, a valve body is driven by an electromagnetic driving force in a predetermined driving period, and detached from a valve seat, whereby a gas state (a gas flow rate or a gas pressure) can be adjusted. A control device drives the valve body to control the time to jet the fuel gas or the jet time of the fuel gas.

DISCLOSURE OF THE INVENTION

In the above fuel cell system, an injector is driven, whereby pulsation is sometimes generated in a fuel gas in a fuel supply channel. Then, vibration due to the pulsation, vibration generated by the driven injector itself (e.g., vibration at a time when a valve body collides with a valve seat), noise due to such vibration, and noise generated by the injector itself (e.g., noise at the time when the valve body collides with the valve seat) are sometimes propagated to another place directly or via piping which defines a fuel gas supply channel.

Such a phenomenon sometimes influences commodity properties especially in a case where the demanded amount of a power to be generated with respect to a fuel cell is small as compared with the amount in another operation state (in a low load operation), as in an idle operation or the like, for example, at a time when the system is mounted on a car, that is, in a situation in which the operation sound of auxiliary devices is small to provide high quietness as compared with another operation state.

The present invention has been developed in view of the above situation, and an object thereof is to provide a fuel cell system capable of decreasing generated pulsation which accompanies injector driving to inhibit the generation of noise due to the pulsation and provide a fuel cell vehicle.

To achieve the above object, a fuel cell system according to the present invention comprises: a fuel cell; a fuel supply system which supplies a fuel gas to the fuel cell; an injector which drives a valve body with an electromagnetic driving force in a predetermined driving period to detach the valve body from a valve seat, whereby a gas state on the upstream side of the fuel supply system is adjusted to jet the gas to a downstream side; and a control device which controls the operation of the injector, wherein the control device allows the injector to jet the gas with a jet flow rate of a predetermined jet flow rate or less in a case where the demanded amount of a power to be generated with respect to the fuel cell is the predetermined amount of the power to be generated or less, and the control device sets the driving frequency of the injector in accordance with the jet flow rate and the demanded amount of the power to be generated.

According to such a constitution, the jet flow rate per jet from the injector can be suppressed to the predetermined jet flow rate or less, so that pulsation and the generation of the noise due to the pulsation can be inhibited.

Moreover, in addition to the suppressing of the jet flow rate to the predetermined jet flow rate or less, the driving frequency of the injector is set (changed) so as to accompany the decrease of the jet flow rate, whereby the total jet flow rate of the injector per unit time can be matched with or brought close to the demanded jet flow rate, and the lowering of response can be inhibited.

It is to be noted that the "gas state" is a gas state indicated by a flow rate, pressure, temperature, molar concentration or the like, and especially includes at least one of the gas flow rate and the gas pressure.

In the fuel cell system of the present invention, the jet flow rate which is the predetermined jet flow rate or less may be a jet flow rate in the minimum jet time set based on, for example, the opening/closing response time of the valve body.

This minimum jet time is beforehand set as the minimum value of the jet time by which the jet flow rate accuracy of the injector is sufficiently ensured, in accordance with properties including the individual difference of the injector, the change of the injector with an elapse of years and the like. For example, the minimum value of a jet time zone in which the injector has a proportional (linear) relation between the jet time and the jet flow rate may be employed.

According to this constitution, the injector can stably be driven while minimizing the jet flow rate of the injector, whereby the pulsation and noise generation that accompany the driving can be minimized.

In the fuel cell system of the present invention, the control device may increase the driving frequency in a case where the need to increase the demanded jet flow rate per unit time with respect to the injector occurs at a time when the injector is allowed to jet the gas with the predetermined jet flow rate or less.

According to this constitution, in a case where the jet flow rate of the injector is to be changed, for example, in a case where the demanded jet flow rate per unit time cannot be secured while the jet flow rate per jet from the injector is suppressed to the predetermined jet flow rate or less, the driving frequency of the injector is increased, whereby the number of jetting times per unit time, that is, a duty (=the jet time per jet/the driving period) can be increased. The total jet flow rate can be increased to inhibit the lowering of response.

In the fuel cell system of the present invention, the control device may provide a restriction on the change rate of the driving frequency.

According to this constitution, it is possible to inhibit pulsation due to irregular jetting caused by the rapid change of the driving frequency and the generation of harsh noise (e.g., the noise generation at indefinite intervals).

In the fuel cell system of the present invention, the control device may decrease the restriction on the change rate of the driving frequency, as the change amount of the demanded jet flow rate per unit time with respect to the injector is large.

In a case where the change amount of the demanded jet flow rate per unit time with respect to the injector is large, when the restriction on the change rate of the driving frequency is increased, the pulsation due to the irregular jetting and the generation of the noise are effectively inhibited, but the lowering of the response might be caused. On the other hand, according to the above constitution, it is possible to achieve both the inhibiting of the pulsation due to the irregular jetting and the generation of the noise and the inhibiting of the lowering of the response.

In the fuel cell system of the present invention, the control device may set, to the driving frequency, a lower-limit driving frequency which is larger than zero.

According to this constitution, the number of the jetting times of the injector, that is, the duty is inhibited from being excessively decreased, so that even when there is a request for the increase of the jet flow rate per unit time from the injector, the lowering of the response can be inhibited.

In the fuel cell system of the present invention, the control device may set a predetermined upper-limit driving frequency to the driving frequency in a case where the demanded amount of the power to be generated with respect to the fuel cell is the predetermined amount of the power to be generated or less, and the control device may increase the jet flow rate per jet from the injector in a case where the demanded jet flow rate per unit time with respect to the injector is not realized by the upper-limit driving frequency.

Even in a case where the jet flow rate of the injector is minimized, when the driving frequency is high, the noise due to the pulsation and vibration increases in the same manner as in a case where the jet flow rate is increased. However, according to the above constitution, the generation of the noise due to the increasing of the jet flow rate per jet and the suppressing of the noise due to the providing of the upper-limit driving frequency are balanced in a direction in which the noise is suppressed, whereby the noise can be decreased as a whole.

The fuel cell system of the present invention further comprises: a plurality of fuel supply sources, wherein the control device may supply the fuel gas to the injector from the fuel supply source in which the primary pressure of the injector is minimum among the plurality of fuel supply sources, in a case where the demanded amount of the power to be generated with respect to the fuel cell is the predetermined amount of the power to be generated or less.

During a low load (small demanded amount of the power to be generated) operation such as the idle operation of the system mounted on the car, the operation sound of the auxiliary devices decreases, and eventually the generated noise which accompanies the driving of the injector becomes conspicuous. However, according to the above constitution, the primary pressure of the injector is decreased to delay the collision speed of the valve body with the valve seat, whereby the noise which accompanies such collision can be decreased.

A fuel cell vehicle according to the present invention is a fuel cell vehicle including a fuel cell system including any one of the above constitutions. Moreover, the case where the demanded amount of the power to be generated with respect to the fuel cell is the predetermined amount of the power to be generated or less is, for example, a case where an idle operation is performed.

During a low load (small demanded amount of the power to be generated) operation such as the idle operation, the operation noise of auxiliary devices is small. Therefore, the generated noise which accompanies of the driving of the injector becomes conspicuous for passengers. However, according to the above constitution, the jet flow rate per jet from the injector is decreased to the predetermined jet flow rate or less, so that the pulsation and the generation of the noise due to the pulsation can be inhibited. Therefore, discomfort is seldom given to the passengers of the fuel cell vehicle.

According to the present invention, it is possible to inhibit the pulsation generated by driving the injector and the generation of the noise due to the pulsation.

BEST MODE FOR CARRYING OUT THE INVENTION

A fuel cell system 1 according to an embodiment of the present invention will hereinafter be described with reference to the drawings. In the present embodiment, an example in which the present invention is applied to a car-mounted power generation system for a fuel cell vehicle will be described.

Figure 1:
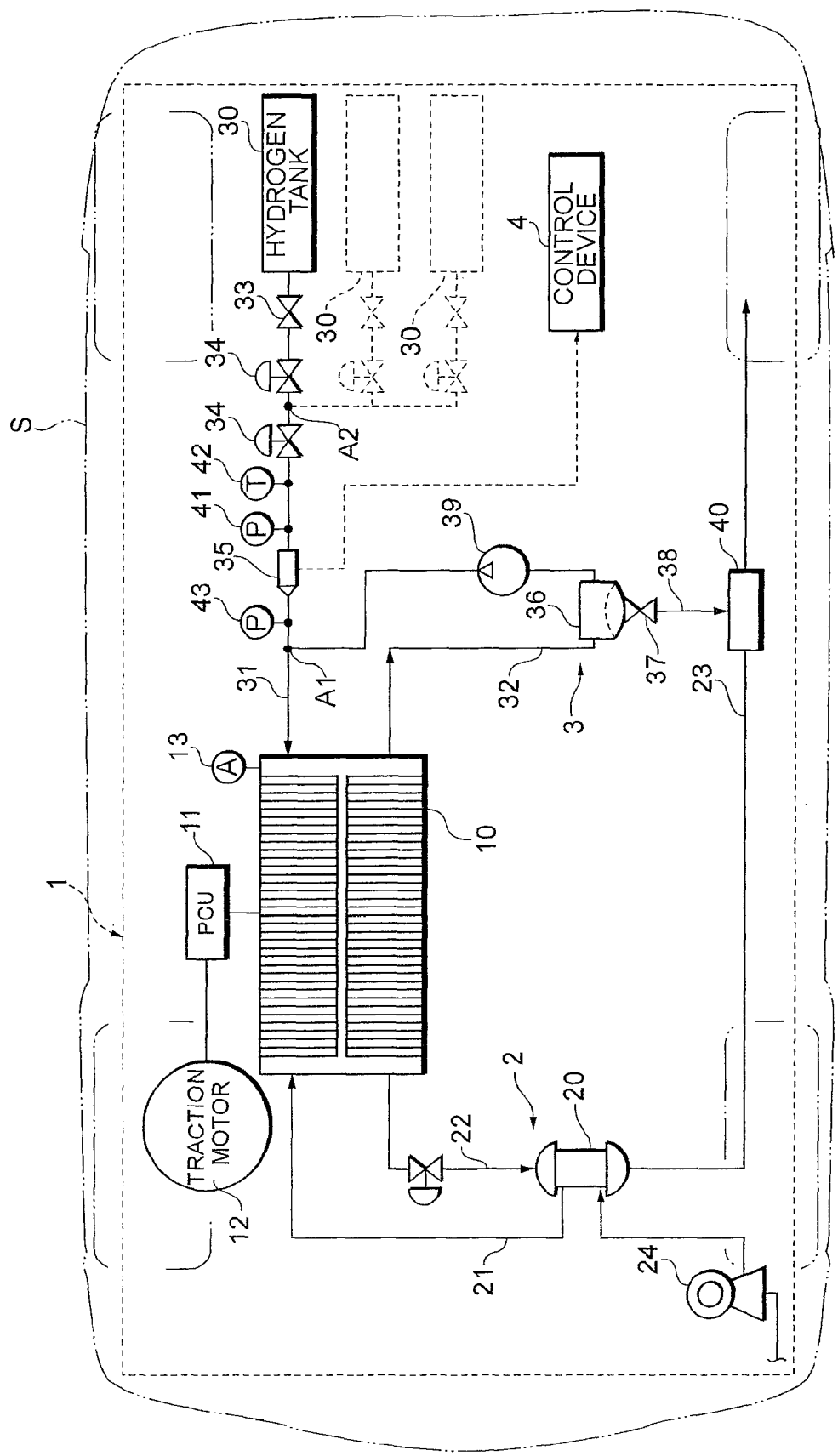
FIG. 1 is a constitution diagram showing a fuel cell system according to an embodiment of the present invention.

As shown in FIG. 1, the fuel cell system 1 according to the present embodiment includes a fuel cell 10 which receives supply of a reaction gas (an oxidizing gas and a fuel gas) to generate a power owing to an electrochemical reaction, an oxidizing gas piping system 2 which supplies air as the oxidizing gas to the fuel cell 10, a hydrogen gas piping system (a fuel supply system) 3 which supplies a hydrogen gas as the fuel gas to the fuel cell 10, a control device 4 which generally controls the whole system and the like.

The fuel cell 10 has a stack structure constituted by laminating the required number of unit cells which receive the supply of the reaction gas to generate the power. The power generated by the fuel cell 10 is supplied to a power control unit (PCU) 11. The PCU 11 includes an inverter, a DC-DC converter and the like arranged between the fuel cell 10 and a traction motor 12. Moreover, a current sensor 13 which detects the current of the power being generated is attached to the fuel cell 10.

The oxidizing gas piping system 2 includes an air supply channel 21 which supplies, to the fuel cell 10, the oxidizing gas (air) humidified by a humidifier 20, an air discharge channel 22 which guides, to the humidifier 20, an oxidizing off gas discharged from the fuel cell 10, and an exhaust channel 23 for externally guiding the oxidizing off gas from the humidifier 20. The air supply channel 21 is provided with a compressor 24 which introduces the oxidizing gas from the atmosphere to feed the gas under pressure to the humidifier 20.

The hydrogen gas piping system 3 includes a hydrogen tank 30 as a fuel supply source in which the hydrogen gas having a high pressure is stored, a hydrogen supply channel 31 as a fuel supply channel for supplying the hydrogen gas from the hydrogen tank 30 to the fuel cell 10, and a circulation channel 32 for returning, to the hydrogen supply channel 31, a hydrogen off gas discharged from the fuel cell 10.

It is to be noted that instead of the hydrogen tank 30, a reformer which forms a hydrogen-rich reformed gas from a hydrocarbonic fuel, and a high-pressure gas tank in which the reformed gas formed by this reformer is brought into a high-pressure state, and accumulated may be employed as a fuel supply source. Moreover, a tank having a hydrogen occluded alloy may be employed as the fuel supply source.

The hydrogen supply channel 31 is provided with a block valve 33 which blocks or allows the supply of the hydrogen gas from the hydrogen tank 30, regulators 34 which adjust the pressure of the hydrogen gas, and an injector 35. Moreover, on the upstream side of the injector 35, there are provided a primary pressure sensor 41 and a temperature sensor 42 which detect the pressure and the temperature of the hydrogen gas in the hydrogen supply channel 31.

Moreover, a secondary pressure sensor 43 which detects the pressure of the hydrogen gas in the hydrogen supply channel 31 is provided on the downstream side of the injector 35, which is the upstream side of a joining part between the hydrogen supply channel 31 and the circulation channel 32.

The regulators 34 are devices which adjust, into a preset secondary pressure, a pressure (the primary pressure) on the upstream side of the regulators. In the present embodiment, mechanical pressure reduction valves for decreasing the primary pressure are employed as the regulators 34. As the constitution of the mechanical pressure reduction valve, a known constitution is employed. The constitution has a housing in which a back pressure chamber and a regulator chamber are separately formed via a diaphragm, and in the regulator chamber, the primary pressure is decreased to a predetermined pressure by use of a back pressure in the back pressure chamber, to obtain the secondary pressure.

In the present embodiment, as shown in FIG. 1, two regulators 34 are arranged on the upstream side of the injector 35, whereby the upstream pressure of the injector 35 can effectively be decreased. In consequence, it can be prevented that the valve body of the injector 35 does not easily move owing to the increase of a differential pressure between the upstream pressure and a downstream pressure of the injector 35.

The injector 35 is an opening/closing valve of an electromagnetic driving type in which a valve body is directly driven with an electromagnetic driving force in a predetermined driving period, and detached from a valve seat, whereby a gas flow rate and a gas pressure can be adjusted. The injector 35 includes the valve seat having a jet hole which jets a gas fuel such as the hydrogen gas, a nozzle body which supplies and guides the gas fuel to the jet hole, and the valve body movably received and held in an axial direction (a gas flow direction) with respect to this nozzle body to open or close the jet hole.

In the present embodiment, the valve body of the injector 35 is driven by a solenoid which is an electromagnetic driving device, and a pulse-like excitation current to be supplied to this solenoid can be turned on or off to switch the open area (the open state) of the jet hole in a multistep manner of two or more steps or a stepless manner. Moreover, the gas jet time of the injector 35 and the time to jet the gas from the injector are controlled based on a control signal output from the control device 4.

It is to be noted that in the present embodiment, as shown in FIG. 1, the injector 35 is arranged on the upstream side from a joining part A1 between the hydrogen supply channel 31 and the circulation channel 32. Moreover, as shown by a broken line in FIG. 1, when a plurality of hydrogen tanks 30 are employed as the fuel supply sources, the injector 35 is arranged on a downstream side from a part (a hydrogen gas joining part A2) where hydrogen gases supplied from the respective hydrogen tanks 30 join one another.

The circulation channel 32 is connected to a discharge channel 38 via a gas-liquid separator 36 and an exhaust drain valve 37. The gas-liquid separator 36 collects a water content from the hydrogen off gas. The exhaust drain valve 37 operates in accordance with an instruction from the control device 4 to discharge (purge), from the system, the water content collected by the gas-liquid separator 36 and the hydrogen off gas (the fuel off gas) including impurities in the circulation channel 32.

Moreover, the circulation channel 32 is provided with a hydrogen pump 39 which pressurizes the hydrogen off gas in the circulation channel 32 to feed the gas toward the hydrogen supply channel 31. It is to be noted that the hydrogen off gas discharged via the exhaust drain valve 37 and the discharge channel 38 is diluted by a diluter 40 to join the oxidizing off gas in the exhaust channel 23.

The control device 4 detects the operation amount of an operation member (an accelerator or the like) for acceleration, provided in a fuel cell vehicle S, and receives control information such as a demanded acceleration value (e.g., the demanded amount of the power to be generated from a load device such as the traction motor 12) to control the operations of various devices in the system.

It is to be noted that in addition to the traction motor 12, examples of a generically referred load device include auxiliary devices (e.g., the compressor 24, the hydrogen pump 39, a cooling pump motor, etc.) required for operating the fuel cell 10, actuators for use in various devices (a change gear, a wheel control device, a steering device, a suspension device, etc.) associated with the traveling of the fuel cell vehicle S, and power consumption devices including an air conditioning device (an air conditioner) for a passenger space, lighting, audio and the like.

The control device 4 is constituted of a computer system (not shown). Such a computer system includes a CPU, an ROM, an RAM, an HDD, an input/output interface, a display and the like. The CPU reads and executes various control programs recorded in the ROM, to realize various control operations.

Figure 2:
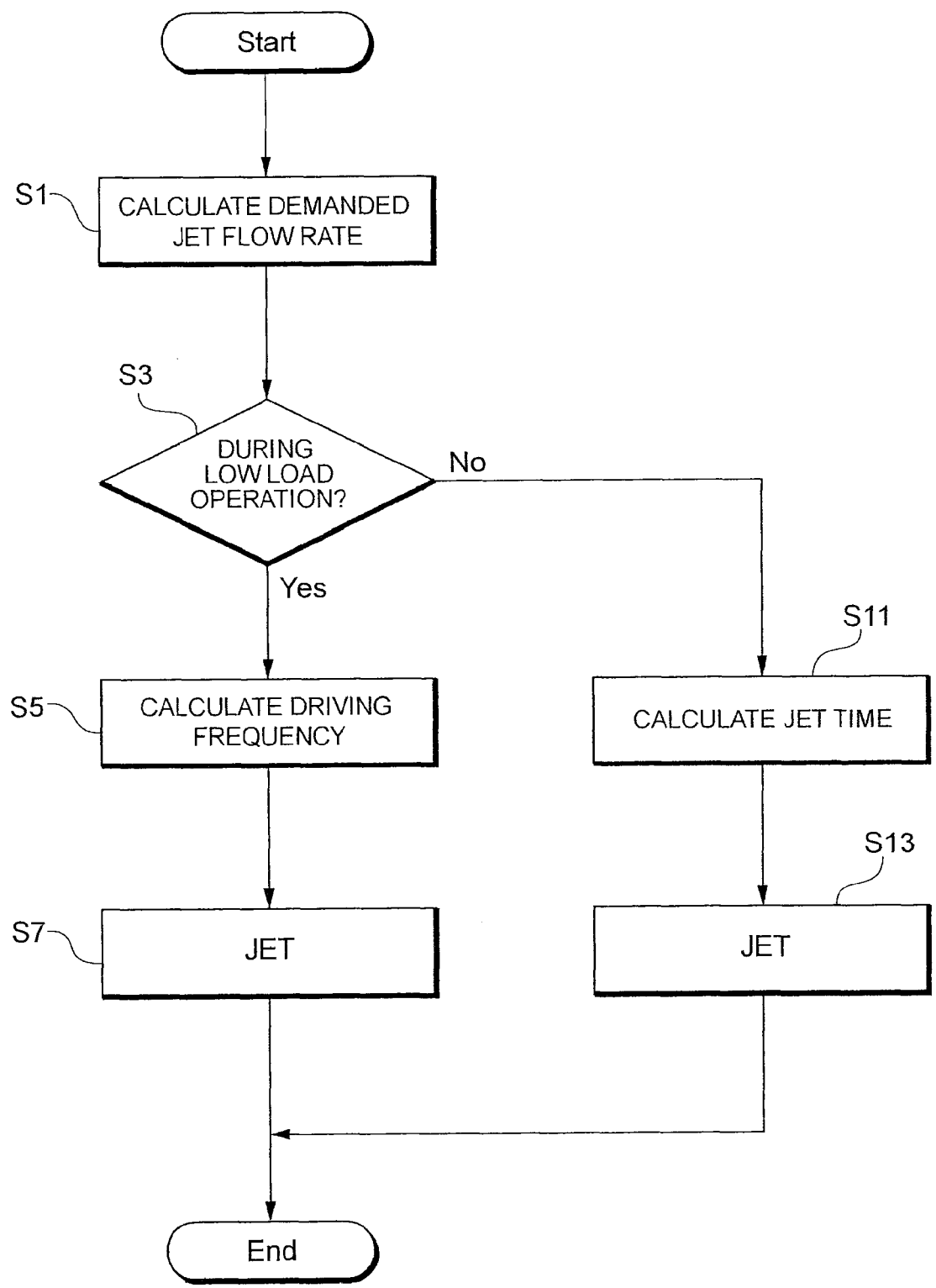
FIG. 2 is a flow chart showing an operation method of the fuel cell system shown in FIG. 1.

Next, the operation method of the fuel cell system 1 according to the present embodiment will be described with reference to the flow chart of FIG. 2.

In step S1 which is a step of calculating a demanded jet flow rate, the control device 4 of the fuel cell system 1 calculates the demanded jet flow rate with respect to the injector 35. Specifically, the control device first detects a current value during the power generation of the fuel cell 10 by use of the current sensor 13, and calculates the amount (hydrogen consumption) of the hydrogen gas to be consumed by the fuel cell 10 based on this current value.

Subsequently, the control device calculates the target pressure value of the hydrogen gas in the downstream position (the pressure adjustment position) of the injector 35 based on the current value detected by the current sensor 13, and calculates a feedforward correction flow rate corresponding to a deviation between the previously calculated target pressure value and the presently calculated target pressure value. This feedforward correction flow rate is a fluctuation (a correction flow rate corresponding to a pressure difference) of the hydrogen gas flow rate due to the fluctuation of the target pressure value.

Furthermore, the control device detects a pressure value in the downstream position (the pressure adjustment position) of the injector 35 by use of the secondary pressure sensor 43 to calculate a feedback correction flow rate based on a deviation between this detected pressure value and the target pressure value. This feedback correction flow rate is a hydrogen gas flow rate (a pressure difference decrease correction flow rate) to be added to the hydrogen consumption to decrease a deviation between the target pressure value and the detected pressure value.

Then, the hydrogen consumption and feedforward correction flow rate calculated based on the detected current value of the current sensor 13, and the feedback correction flow rate calculated based on the detected pressure value of the secondary pressure sensor 43 are added up to calculate the demanded jet flow rate with respect to the injector 35.

Here, a static flow rate on the upstream side of the injector 35 is calculated based on the pressure of the hydrogen gas on the upstream side of the injector 35, detected by the primary pressure sensor 41, and the temperature of the hydrogen gas on the upstream side of the injector 35, detected by the temperature sensor 42. Afterward, the demanded jet flow rate may be divided by this static flow rate to correct the demanded jet flow rate in accordance with the temperature and the pressure.

Subsequently, in the low load operation judgment of step S3, the control device 4 selects one of two prepared injector control patterns according to the present embodiment, in accordance with the operation state of the fuel cell 10.

Specifically, in a low load operation state in which the demanded amount of the power to be generated with respect to the fuel cell 10 is the predetermined amount of the power to be generated or less as in the idle operation, that is, in a case where the judgment result of the step S3 is "YES" in the present embodiment, in step S5 as a driving frequency calculation step, first the jet time per jet is set (fixed) so that the jet flow rate per jet from the injector 35 is constantly the jet flow rate for the minimum jet time.

Subsequently, in a case where the injector 35 jets the gas only for the minimum jet time, the duty (=the minimum jet time/the driving period of the injector) capable of realizing the demanded jet flow rate obtained in the step S1 is calculated, and the driving frequency to be variably set is calculated based on this duty.

Figure 3:
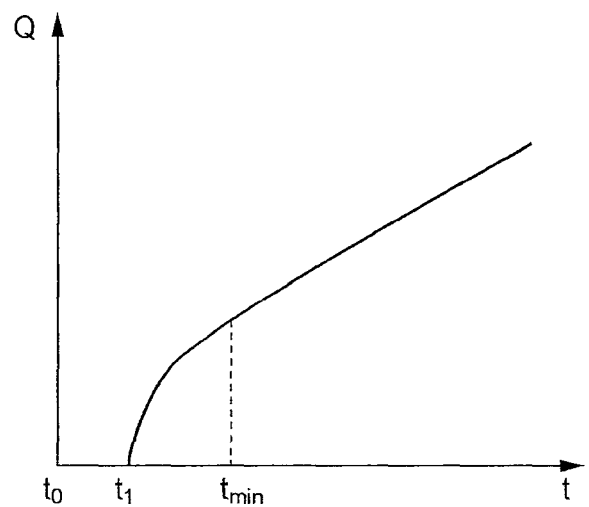
FIG. 3 is a diagram showing the minimum jet time of an injector shown in FIG. 1.

The minimum jet time is beforehand set as the minimum value of the jet time by which the accuracy of the jet flow rate of the injector 35 is sufficiently ensured, in accordance with the properties of the injector 35 including the individual difference, the change with the elapse of years and the like. For example, as shown in FIG. 3, a minimum value tmin of a jet time zone in which the injector 35 has a proportional (linear) relation between a jet time t and a jet flow rate Q may be employed.

It is to be noted that time t0 to t1 is an invalid jet time which is time required from a time when the injector 35 receives the control signal from the control device 4 to a time when the jetting actually starts.

Moreover, this minimum jet time can beforehand be set by adding up time from a time when the control device 4 gives an opening instruction to the injector 35 to a time when the valve body has a totally opened state and time to a time when the jet flow rate in this totally opened state is stabilized. In addition, this time may be set by experiment, simulation or the like.

On the other hand, in a case where the fuel cell 10 has an operation state other than the state of the above predetermined low load operation, that is, in a case where the judgment result of the step S3 is "NO", in step S11 which is a jet time calculation step, the control device calculates the total jet time of the injector 35 which satisfies the demanded jet flow rate obtained in the step S1, and the control device calculates the jet time per jet from this total jet time and an invariable driving frequency beforehand set to a constant value.

Afterward, in step S7, the control device 4 outputs, to the injector 35, a control signal concerned with the driving frequency of the injector 35 calculated in the step S5 as the driving frequency calculation step and the minimum jet time beforehand set to the constant value. Alternatively, in step S13, the control device outputs, to the injector 35, a control signal concerned with the jet time per jet from the injector 35 calculated in the step S11 as the jet time calculation step and the preset invariable driving frequency, whereby the gas jet time of the injector 35 and the time to jet the gas from the injector are controlled to adjust the flow rate and pressure of the hydrogen gas to be supplied to the fuel cell 10.

As described above, according to the fuel cell vehicle S on which the fuel cell system 1 of the present embodiment is mounted, during a low load (the small demanded amount of the power to be generated) operation such as the idle operation, the operation sound of auxiliary devices such as the compressor 24 and the hydrogen pump 39 is small, and hence the noise becomes conspicuous for the passenger. However, the jet flow rate per jet from the injector 35 is set to the jet flow rate corresponding to the minimum jet time, and is thus minimized, whereby the pulsation of the injector 35 and the generation of the noise due to the pulsation can be inhibited, and discomfort given to the passenger is eliminated or decreased.

In addition, in addition to the setting and minimizing of the jet flow rate of the injector 35 to the jet flow rate corresponding to the minimum jet time, the driving frequency of the injector 35 is variably controlled so as to accompany the decrease of the jet flow rate, so that the total jet flow rate from the injector 35 per unit time can be matched with or brought close to the demanded jet flow rate, and the lowering of the response can be inhibited.

Figure 4:
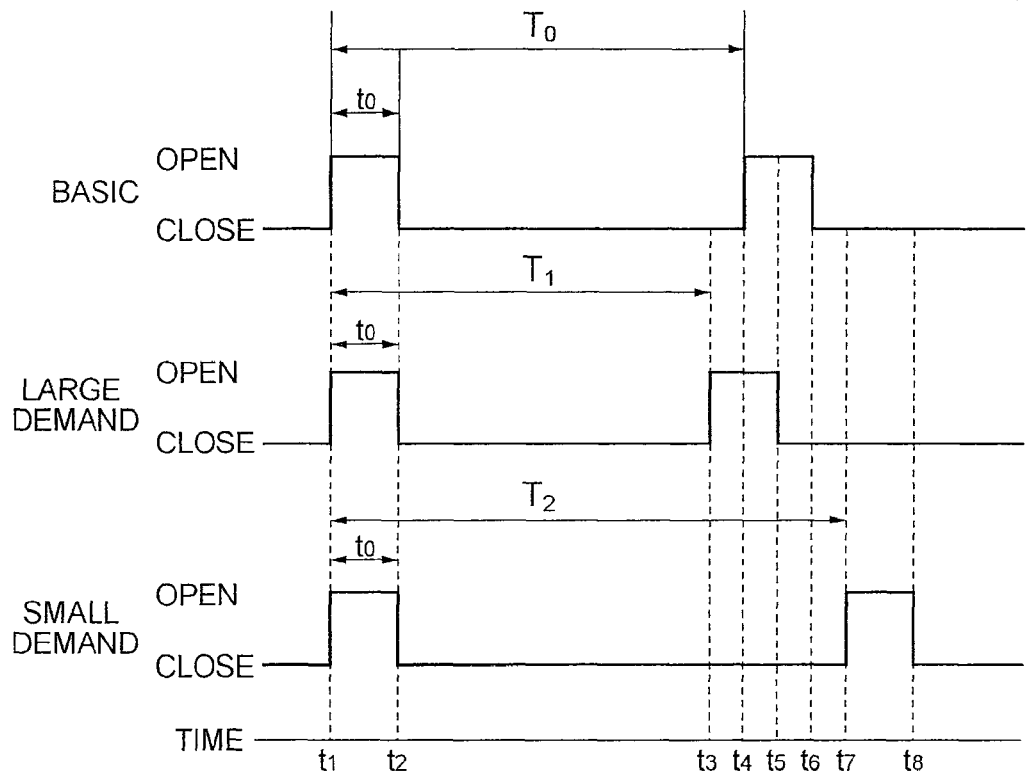
FIG. 4 is a time chart showing one example of a basic control pattern with respect to the injector, and control patterns in a case where a demanded jet flow rate is increased and decreased from a state in which the injector is controlled with the basic control pattern.

It is to be noted that in the above embodiment, in a case where the need to increase the demanded jet flow rate per unit time with respect to the injector 35 occurs at a time when the injector 35 perform the jetting in the minimum jet time, as shown in FIG. 4, the variably set driving frequency may further be increased.

That is, as shown in the upper stage of the time chart of FIG. 4, in a case where the operation of the injector 35 is controlled in a basic control pattern in which the jetting is repeated in the minimum jet time t0 (=t2−t1=t6−t4) at a predetermined driving frequency (=1/driving period T0=1/(t4−t1)) and the need to increase the demanded jet flow rate occurs, as shown in the medium stage of the time chart of the drawing, the driving frequency (=1/driving frequency T1=1/(t3−t1)) is increased from the present driving frequency (the driving period T1 is shortened).

In consequence, the duty (=t0/T1) after changing the driving frequency is larger than present duty (=t0/T0) in the basic control pattern. In other words, the number of the jetting times per unit time of, for example, time t1 to t4 increases, and hence the total jet flow rate increases.

Therefore, even in a case where the jet flow rate of the injector 35 is to be changed because a new demanded jet flow rate cannot be achieved by the present jet flow rate in the minimum jet time, for example, even in a case where there is a request for the acceleration from the driver during the idle operation, the total jet flow rate per unit time can be increased. Therefore, the lowering of the response can be inhibited.

On the other hand, in a case where the injector 35 is controlled in the basic control pattern, conversely to the above case, when the need to decrease the demanded jet flow rate occurs, as shown in the time chart of the lower stage of the drawing, the driving frequency (=1/driving period T2=1/(t7−t1)) is set to a driving frequency lower than the present driving frequency (the driving period T2 is lengthened), whereby the duty (=t0/T2) after changing the driving frequency may be set to a duty smaller than the present duty (=t0/T0) in the basic control pattern.

Moreover, the control device 4 may provide a restriction on the change rate of the variably controlled driving frequency at a time when the injector 35 is allowed to perform the jetting in the minimum jet time. According to this constitution, the pulsation due to irregular jetting caused by the rapid change of the driving frequency and the generation of harsh noise (e.g., the generation of the noise at indefinite intervals) can be inhibited.

Further in this case, as the change amount of the demanded jet flow rate per unit time with respect to the injector 35 is large, the restriction on the change rate of the driving frequency may be small.

That is, in a case where the change amount of the demanded jet flow rate per unit time with respect to the injector 35 is large, when the restriction on the change rate of the driving frequency is increased, the pulsation due to the irregular jetting and the generation of the noise are effectively inhibited, but the response might lower. However, according to the above constitution, it is possible to achieve both the inhibiting of the pulsation due to the irregular jetting and the generation of the noise and the inhibiting of the lowering of the response.

Moreover, the control device 4 may set, to the driving frequency, the lower-limit driving frequency larger than zero. According to this constitution, the number of the jetting times of the injector 35, that is, the duty is inhibited from being excessively decreased. Therefore, even when there is a request for the increase of the jet flow rate per unit time from the injector 35, the lowering of the response can be inhibited.

The control device 4 may set a predetermined upper-limit driving frequency to the driving frequency of the injector 35 in a case where the demanded amount of the power to be generated with respect to the fuel cell 10 is the predetermined amount of the power to be generated or less, and the control device may increase the jet flow rate per jet in a case where the demanded jet flow rate per unit time with respect to the injector 35 cannot be realized by this upper-limit driving frequency.

That is, even in a case where the jet flow rate of the injector 35 is minimized, when the driving frequency is high, the noise due to the pulsation and vibration increases in the same manner as in a case where the jet flow rate is increased. However, according to the above constitution, the generation of the noise due to the increasing of the jet flow rate per jet and the suppressing of the noise due to the providing of the upper-limit driving frequency are balanced in the direction in which the noise is suppressed, whereby the noise can be decreased as a whole.

Furthermore, in a case where a plurality of hydrogen tanks 30 are disposed as in the fuel cell system 1 of the present embodiment, when the demanded amount of the power to be generated with respect to the fuel cell 10 is the predetermined amount of the power to be generated or less, the control device 4 may supply the fuel gas to the injector 35 from the hydrogen tank 30 in which the primary pressure of the injector 35 is minimum among the plurality of hydrogen tanks 30.

During a low load (the small demanded amount of the power to be generated) operation such as the idle operation of the system mounted on the car, the operation sound of the auxiliary devices is small, and hence the generated noise which accompanies the driving of the injector 35 becomes conspicuous for the passenger. However, according to the above constitution, the primary pressure of the injector 35 is decreased, whereby the collision speed of the valve body with the valve seat is delayed, and the noise which accompanies such collision can be decreased. Therefore, the discomfort given to the passenger is eliminated or decreased.

Moreover, in the above embodiments, the example in which the fuel cell system according to the present invention is mounted on the fuel cell vehicle S has been described, but the fuel cell system of the present invention may be mounted on various mobile bodies (a robot, a ship, an airplane, etc.) in addition to the fuel cell vehicle S. Furthermore, the fuel cell system according to the present invention may be applied to a stational power generation system for use as a power generation equipment for a construction (a housing, a building or the like).

The invention claimed is:

1. A fuel cell system comprising:
    a fuel cell;
    a fuel supply system which supplies a fuel gas to the fuel cell;
    an injector which drives a valve body with an electromagnetic driving force in a predetermined driving period to detach the valve body from a valve seat, whereby a gas state on the upstream side of the fuel supply system is adjusted to jet the gas to a downstream side; and
    a control device which controls the operation of the injector,
    wherein the control device allows the injector to jet the gas with a jet flow rate of a predetermined jet flow rate or less in a case where a demanded amount of power to be generated with respect to the fuel cell is a predetermined amount of power to be generated or less, and the control device sets a driving frequency of the injector in accordance with the jet flow rate and the demanded amount of the power to be generated.

2. The fuel cell system according to claim 1, wherein the jet flow rate which is the predetermined jet flow rate or less is a jet flow rate in the minimum jet time set based on the opening/closing response time of the valve body.

3. The fuel cell system according to claim 2, wherein the control device increases the driving frequency in a case where the need to increase the demanded jet flow rate per unit time with respect to the injector occurs at a time when the injector is allowed to jet the gas with the predetermined jet flow rate or less.

4. The fuel cell system according to claim 1, wherein the control device provides a restriction on a change rate of the driving frequency.

5. The fuel cell system according to claim 4, wherein the control device decreases the restriction on the change rate of the driving frequency, as the change amount of the demanded jet flow rate per unit time with respect to the injector increases.

6. The fuel cell system according to claim 5, wherein the control device sets, to the driving frequency, a lower-limit driving frequency which is larger than zero.

7. The fuel cell system according to claim 1, wherein the control device sets a predetermined upper-limit driving frequency to the driving frequency in a case where the demanded amount of the power to be generated with respect to the fuel cell is the predetermined amount of the power to be generated or less, and the control device increases the jet flow rate per jet from the injector in a case where the demanded jet flow rate per unit time with respect to the injector is not realized by the upper-limit driving frequency.

8. The fuel cell system according to claim 1, further comprising:
    a plurality of fuel supply sources,
    wherein the control device supplies the fuel gas to the injector from the fuel supply source in which the primary pressure of the injector is minimum among the plurality of fuel supply sources, in a case where the demanded amount of the power to be generated with respect to the fuel cell is the predetermined amount of the power to be generated or less.

9. A fuel cell vehicle which comprises the fuel cell system according to claim 1.

10. The fuel cell vehicle according to claim 9, wherein the case where the demanded amount of the power to be generated with respect to the fuel cell is the predetermined amount of the power to be generated or less is a case where an idle operation is performed.

* * * * *